United States Patent
Dave et al.

(10) Patent No.: US 11,714,900 B2
(45) Date of Patent: Aug. 1, 2023

(54) SYSTEM AND METHOD FOR IMPLEMENTING RE-RUN DROPPED DETECTION TOOL

(71) Applicant: JPMorgan Chase Bank, N.A., New York, NY (US)

(72) Inventors: Eshan Dave, New York, NY (US); Yusuf N. Kapadia, Monmouth Junction, NJ (US); Rony Roy, London (GB); Benjamin D. Smith, Singapore (SG); Jasir Mohammed Kundum Kadavuthu, Singapore (SG); Cosmin-Stefan Marin, London (GB); Narasimham Gudimella, Raritan, NJ (US); Pedro Gomez Garcia, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 246 days.

(21) Appl. No.: 17/002,305

(22) Filed: Aug. 25, 2020

(65) Prior Publication Data

US 2021/0081525 A1    Mar. 18, 2021

Related U.S. Application Data

(60) Provisional application No. 62/899,928, filed on Sep. 13, 2019.

(51) Int. Cl.
*G06F 21/55* (2013.01)
*G06F 21/52* (2013.01)
*G06F 21/57* (2013.01)
*H04L 41/0604* (2022.01)

(52) U.S. Cl.
CPC ............ *G06F 21/554* (2013.01); *G06F 21/52* (2013.01); *G06F 21/577* (2013.01); *H04L 41/0609* (2013.01); *G06F 2221/034* (2013.01)

(58) Field of Classification Search
CPC ................. G06F 21/554; G06F 2221/034
See application file for complete search history.

(56) References Cited

U.S. PATENT DOCUMENTS

| | | | |
|---|---|---|---|
| 9,910,874 B1 * | 3/2018 | Jamail ................... | G06F 16/215 |
| 2002/0198923 A1 * | 12/2002 | Hayes, Jr. ............. | G06F 9/5038 |
| | | | 718/103 |
| 2008/0229319 A1 * | 9/2008 | Marchand ............. | G06F 9/5027 |
| | | | 718/104 |
| 2012/0150819 A1 * | 6/2012 | Lindahl ................. | G06F 16/273 |
| | | | 707/687 |
| 2012/0222032 A1 * | 8/2012 | Ferdous ............... | G06F 11/3442 |
| | | | 718/100 |
| 2012/0260306 A1 * | 10/2012 | Njemanze ............... | G06Q 10/06 |
| | | | 726/1 |
| 2013/0085799 A1 * | 4/2013 | Zhang .................... | G06Q 10/00 |
| | | | 705/7.26 |

(Continued)

*Primary Examiner* — David J Pearson
(74) *Attorney, Agent, or Firm* — Greenblum & Bernstein, P.L.C.

(57) ABSTRACT

An embodiment of the present invention is directed to a Re-Run Dropped Detection Tool that provides various features and tools to prepare, execute and monitor status of a Re-Run process. An embodiment of the present invention is directed to an automated dispatch/monitoring of alert jobs as well as monitoring of Re-Run as a Service (RRAAS) solution.

20 Claims, 2 Drawing Sheets

(56) References Cited

U.S. PATENT DOCUMENTS

| | | | |
|---|---|---|---|
| 2013/0145205 A1* | 6/2013 | Lee | H04L 41/064 |
| | | | 714/E11.112 |
| 2014/0101763 A1* | 4/2014 | Harlacher | H04L 63/1458 |
| | | | 711/163 |
| 2014/0173618 A1* | 6/2014 | Neuman | G06F 9/5066 |
| | | | 718/104 |
| 2017/0177411 A1* | 6/2017 | Thomas | G06Q 10/06393 |
| 2019/0132350 A1* | 5/2019 | Smith | G06F 21/577 |

* cited by examiner

SYSTEM AND METHOD FOR IMPLEMENTING RE-RUN DROPPED DETECTION TOOL

CROSS REFERENCE TO RELATED APPLICATIONS

The application claims priority to U.S. Provisional Application 62/899,928, filed Sep. 13, 2019, the contents of which are incorporated herein in its entirety.

FIELD OF THE INVENTION

The invention relates generally to a system and method for implementing a Re-Run Dropped Detections tool.

BACKGROUND OF THE INVENTION

When technical issues arise for any reliant infrastructure or data that Cyber Operations utilize for monitoring controls, there exists a possibility that an entity will miss detection and thereby introduce visibility risk and/or detection risk as a result. Feed and platform outages impact the ability to triage and action results generated by monitoring controls in a Security Information Event Management (SIEM) system, such as Splunk or other software platforms.

Following the remediation of the issues, Cyber Operations Content may then "rerun" the alerts aligned to the data feed or infrastructure to account for any missed detection as a result of the data feed outage. This may involve a Cyber Content Team re-running scheduled searches to account for any missed events as a result of the feed and platform outage. Current solutions fail to properly and efficiently address and mitigate associated risks and inefficiencies.

These and other drawbacks exist.

SUMMARY OF THE INVENTION

According to one embodiment, the invention relates to a system that implements a Re-Run Dropped Detections Tool. The system comprises: an interactive Re-Run Dashboard that generates re-run data and impact scope responsive to an outage and further provides real-time monitoring of re-run status and visualization of one or more metrics, wherein the interactive Re-Run Dashboard provides one or more alerts to one or more predetermined recipients; and a Dispatch Engine comprising a computer processor that is programmed to process the re-run data, perform job generation and perform re-run monitor data generation over an outage window associated with the impact scope; wherein the interactive Re-Run Dashboard communicates with the Dispatch Engine via an application program interface (API).

According to another embodiment, the invention relates to a method that implements a Re-Run Dropped Detections Tool. The method comprises the steps of: generating, via an interactive Re-Run Dashboard, re-run data and impact scope responsive to an outage; providing real-time monitoring of re-run status and visualization of one or more metrics, wherein the interactive Re-Run Dashboard provides one or more alerts to one or more predetermined recipients; processing, via a Dispatch Engine, the re-run data; performing, via the Dispatch Engine, job generation; and performing, via the Dispatch Engine, re-run monitor data generation over an outage window associated with the impact scope; wherein the interactive Re-Run Dashboard communicates with the Dispatch Engine via an application program interface (API).

The system may include a specially programmed computer system comprising one or more computer processors, interactive interfaces, electronic storage devices, and networks. The computer implemented system and method described herein provide unique advantages to entities, organizations and other users, according to various embodiments of the invention. An embodiment of the present invention may extend functionality to various solutions, including alert verification, health monitoring, etc. An embodiment of the present invention may realize an increase in efficiency via a reduction in overall time/resources consumed by the Re-Run process, which may involve time and resources directed to preparation, execution and triage. An embodiment of the present invention may further decrease risk relating to feed and platform outages. To properly address outages, an embodiment of the present invention recognizes that an understanding of the outage is needed, including timeframe of missing data, type of data missing and why the outage occurred, e.g., data feed error, infrastructure issues, resource utilization, user permission configuration, etc. Moreover, time to rerun critical alerts may be greatly reduced by prioritizing them higher in the queue. Also, reduction in duplicates allows analysts to triage relevant alerts. An embodiment of the present invention may further provide post mitigation automated communication as well as consolidated reporting.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
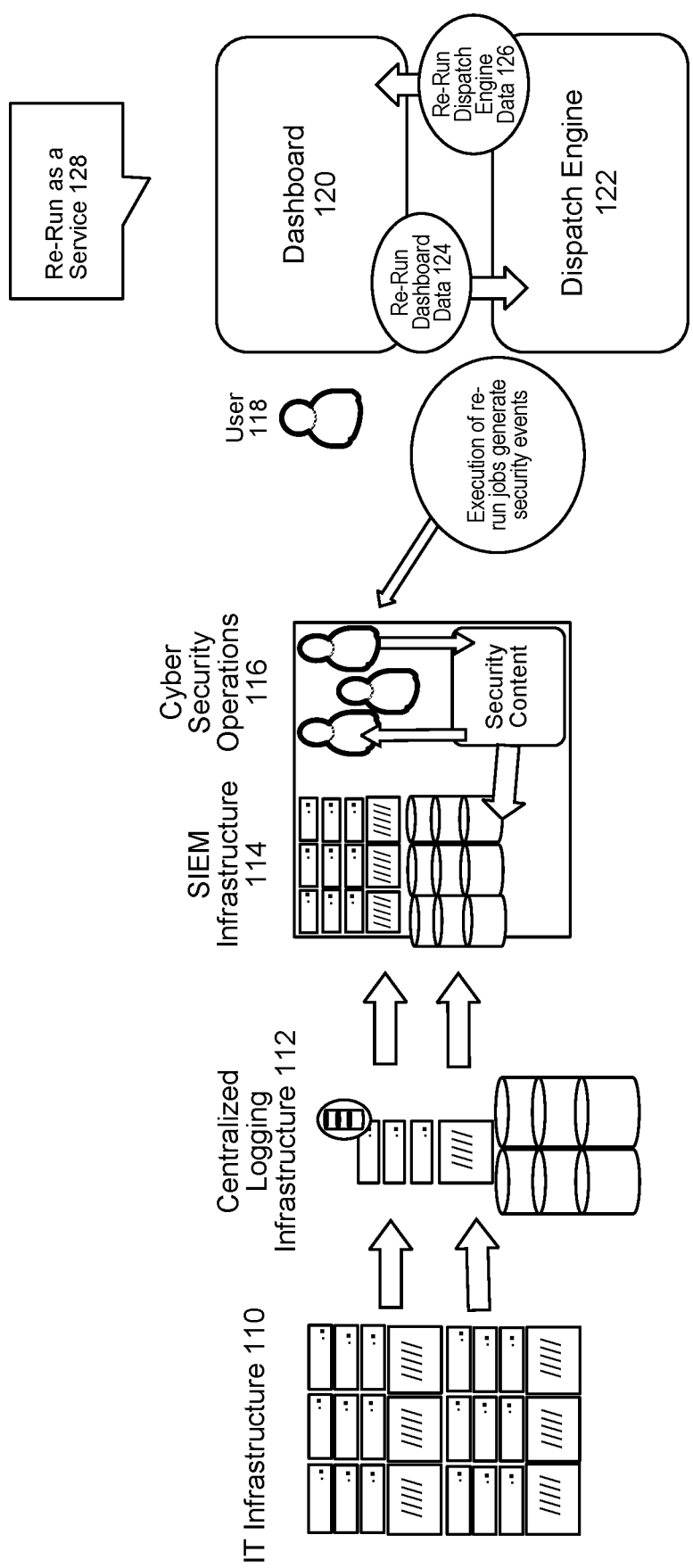
FIG. 1 is an exemplary system for implementing Re-Run Dropped Detection tool, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Re-Run Dropped Detection Tool that provides various features and tools to prepare, execute and monitor status of a Re-Run process. The Re-Run as a Service (RRAAS) solution may be built on a mixture of technologies including but not limited to Splunk, Phantom, Java script and Python. Other STEM systems and components that provide insights into machine data generated by security technologies may be implemented.

An embodiment of the present invention is directed to automated dispatching and monitoring of alert jobs as well as monitoring of the RRAAS solution. According to an embodiment of the present invention, the Re-Run Dropped Detection Tool may include: (1) STEM Application and (2) Security Workflow, e.g., Phantom Playbook. Security workflows may include customized, repeatable security workflows that may be automated specifically for threat intelligence actions. SIEM Application (e.g., Dashboard) may generate data inputs, execute/stop a Re-Run process and monitor the Re-Run process in real-time. For example, Phantom Playbook may use Python to parse and make decisions based on the data inputs specified by an application. An embodiment of the present invention may use Phantom Playbook (or other workflow) to execute search jobs to cover an outage window. A search job may represent an individual instance of a search query utilizing pre-defined knowledge objects over a defined time-range to generate the relevant results over a specified data source. An example may include executing a query such as: how many IPs requested a home page in the last 24 hours from web logs. An embodiment of the present invention is directed to a standardized automated approach by using a RRAAS model and inputs (e.g., real time inputs based on platform utilization). Accordingly, an embodiment of the present invention is directed to mitigating infrastructure and data outage related risk and inefficiencies.

An exemplary Re-Run Dropped Detection implementation may include a system with Dashboard, Dispatch Engine, Dispatch Monitor and Monitor components. Users may access the system for content, attack analysis, threat intelligence, Employee Compliance Monitoring (ECM), brand protection and production support. Through an interactive user interface, users may efficiently prepare Re-Run related data as well as execute Re-Run jobs.

According to an exemplary illustration, the Dashboard may generate data for feed, platform, and custom Re-Run tasks. For example, a user may generate Re-Run data, initiate a Re-Run process, monitor the Re-Run progress and view/access related metrics. The Dashboard may utilize pre-built search templates with easy-to-use customization functionality for end-users to generate the data needed. Once data inputs are defined, the Dashboard may query an API, e.g., Splunk API. With the Dashboard, users may define inputs and execute the process from a software platform, e.g., Splunk. For example, Dashboard may be integrated as a stand-alone software application, e.g., Splunk Application. Other implementations and architectures may be realized.

According to an exemplary illustration, a Dispatch Engine may process Re-Run Data, enrich Re-Run Data and execute Search Jobs using an API, e.g., Splunk API, etc. Re-Run process may be split into separate sub-processes as containers, e.g., Phantom containers. The Dispatch Engine may impose considerations as enrichment data to each job, including: Alert Criticality; Execution/Polling control flow; Platform Utilization and Removal of duplicate alerts. For a particular outage window, the Dispatch Engine may calculate how many jobs would be executed over a Re-Run window. The jobs may be dispatched in bundles so as not to negatively impact the platform. For example, a control flow may dispatch the jobs in a manner that does not over-utilize the platform.

An embodiment of the present invention is directed to ad-hoc query modification allowing for more targeted re-run results. An embodiment of the present invention may utilize user input to execute targeted search jobs by crafting ad-hoc queries based on an original search logic. An embodiment of the present invention provides functionality that automates the processing of rerun input variables, crafting of the targeted search query and generation of the resulting alerts. This provides a reduction in erroneous alerts and an increase in the relevance of alerts generated by a rerun.

According to an exemplary illustration, a Dispatch Monitor may provide logging of relevant flows as they occur which may then be sent to software platform, e.g., Splunk, to be indexed and monitored in Re-Run Dashboard. The Dispatch Monitor provides metrics for post-processing of Re-Run data available in Splunk, for example.

According to an exemplary illustration, a Monitor may provide Real Time Monitoring of the Re-Run Process. The Monitor provides visualizations of various metrics, including Job Status, platform utilization, result count per alert, estimated time to complete, etc. In addition, metrics may be analyzed for post-incident analysis and further improvement and prediction.

FIG. 1 is an exemplary system for implementing Re-Run Dropped Detection tool, according to an embodiment of the present invention. As shown in FIG. 1, IT Infrastructure 110 may generate data that may be consumed by Centralized Logging Infrastructure 112. This may occur through data collection and aggregation middeware, for example. Centralized Logging Infrastructure 112 may forward the data to a SIEM Infrastructure 114 (e.g., Splunk) where it may be utilized for ad-hoc and scheduled data analysis.

SIEM Infrastructure 114 may rely on data feeds for its operation. As with any critical technology related infrastructure, there are safeguards and controls in place to ensure a highly available solution. Cyber Security Operations 116 may manage and monitor Security Content. For example, Security Content may represent objects that contribute to detection use-cases that may be utilized to continuously monitor an environment for threats. Examples may include search query, reference data, modular code/commands.

User 118 may interact with Dashboard 120 to monitor Re-Run jobs. Through Dashboard 120, User 118 may perform various functions. For example, User 118 may define Re-Run inputs; evaluate inputs and determine a scope of impacted security content. User 118 may also execute/kill a re-run process as well as monitor a re-run process.

Dashboard 120 may interact with Dispatch Engine 122 to support Re-Run as a Service (RRAAS) 128. As shown in FIG. 1, Dispatch Engine 122 may send re-run dispatch engine data 126 to Dashboard 120. And, Dashboard 120 may send re-run dashboard data 124 to Dispatch Engine 122. Dispatch Engine 122 may process re-run input; bundle re-run jobs; set re-run queues and execute re-run jobs. With Dispatch Engine 122, execution of re-run jobs may generate security events.

Re-Run Dropped Detections Tool may represent a highly scalable robust solution that addresses and mitigates the risk associated with temporary loss of a datafeed.

Figure 2:
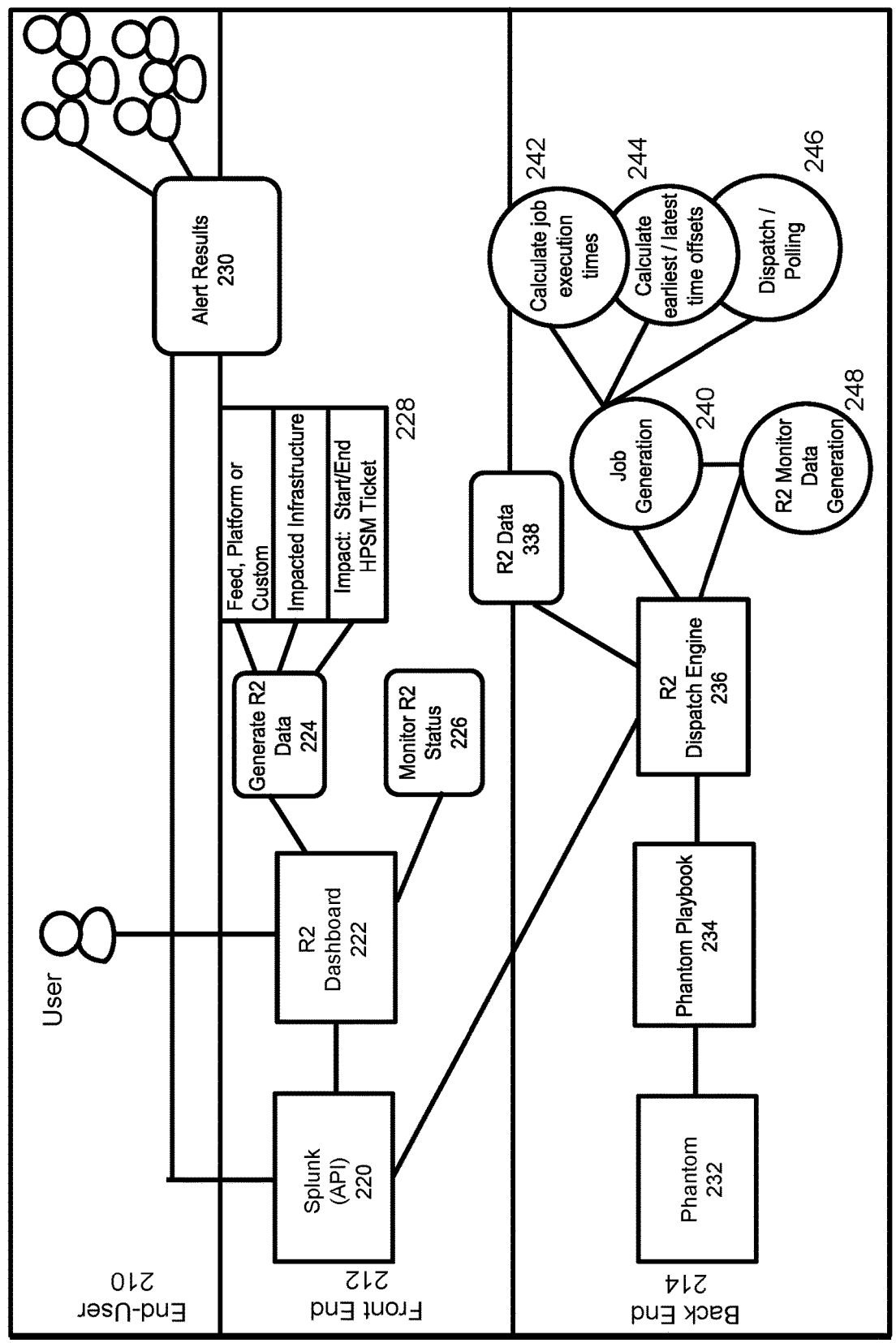
FIG. 2 is an exemplary flow diagram for implementing Re-Run Dropped Detection tool, according to an embodiment of the present invention.

FIG. 2 is an exemplary flow diagram for implementing a Re-Run Dropped Detection Tool, according to an embodiment of the present invention. FIG. 2 illustrates interactions between End User 210, Front End 212 and Backend 214. A User may interact with a Re-Run (R2) Dashboard 222, which supports API 220. R2 Dashboard 222 may generate R2 data, as shown by 224, and monitor R2 status, as shown by 226. R2 Data may include data relating to data feed, platform, custom, impacted infrastructure and impact (e.g., start/end of the outage, captured under a ticketing tool, such as HPSM ticketing tool) represented by 228. Alert Results 230 may be provided to one or more recipients.

BackEnd 214 may support R2 Dispatch Engine 236 which communicates via API 220 with R2 Dashboard 222. According to an embodiment of the present invention, BackEnd 214 may include Phantom 232 and Phantom Playback 234. Other security automation platforms and workflows may be implemented. R2 Dispatch Engine 236 may process R2 Data 238, perform Job Generation 240 and perform R2 Monitor data generation 248. Job Generation 240 may include calculating job execution times 242, calculating earliest/latest time offsets 244, and dispatching and polling operations 246. Job Generation may include generating variables required to execute a search job. These variables may include: execution time (e.g., the time that the search job is supposed to run, based on its respective schedule) and time offsets or time windows (e.g., earliest/latest time, which is the earliest/latest time to use when searching the data source. Dispatching/Polling Operations may include operations to send a search job to the SIEM for execution and poll the STEM for resource utilization to guide the dispatch operations.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a Re-Run Dropped Detections Tool, the system comprising:
    a processor; and
    a memory storing executable instructions that, when executed by the processor, cause the processor to implement:
        an interactive Re-Run Dashboard that: generates re-run data and impact scope responsive to an outage; provides real-time monitoring of re-run status and visualization of one or more metrics; and polls an application for resource utilization in order to guide dispatch operations, wherein the interactive Re-Run Dashboard provides an amount of results for each of one or more alerts to one or more predetermined recipients; and
        a Dispatch Engine that is programmed to: process the re-run data; perform job generation; execute a search job; and perform re-run monitor data generation over an outage window associated with the impact scope, wherein the job generation comprises calculating job execution times and utilizing the job execution times to send the search job to the interactive Re-Run Dashboard; and
            wherein the interactive Re-Run Dashboard communicates with the Dispatch Engine via an application program interface (API).

2. The system of claim 1, wherein the Dispatch Engine enriches the re-run data and executes search jobs via the API.

3. The system of claim 1, wherein the re-run data relates to one or more of: a datafeed, a platform and one or more custom tasks.

4. The system of claim 1, wherein the re-run data relates to impacted infrastructure data.

5. The system of claim 1, wherein the re-run data includes impact data comprising start data and end data of the outage.

6. The system of claim 1, wherein the job generation comprises calculating earliest or latest time offsets.

7. The system of claim 1, wherein the job generation comprises one or more dispatch operations.

8. The system of claim 1, wherein the job generation comprises one or more polling operations.

9. The system of claim 1, wherein the interactive Re-Run Dashboard receives one or more inputs from a user.

10. The system of claim 1, wherein the search job is a search for an amount of internet protocol (IP) addresses that requested a web page during a predetermined period of time.

11. A method that implements a Re-Run Dropped Detections Tool, the method comprising:
    generating, via an interactive Re-Run Dashboard, re-run data and impact scope responsive to an outage;
    providing real-time monitoring of re-run status and visualization of one or more metrics, wherein the interactive Re-Run Dashboard provides an amount of results for each of one or more alerts to one or more predetermined recipients;
    processing, via a Dispatch Engine, the re-run data;
    performing, via the Dispatch Engine, job generation:
        wherein the job generation comprises calculating job execution times and utilizing the job execution times to send a search job to the interactive Re-Run Dashboard; and
        wherein the interactive Re-Run Dashboard communicates with the Dispatch Engine via an application program interface (API);
    executing, by the Dispatch Engine, the search job;
    polling, by the interactive Re-Run Dashboard, an application for resource utilization to guide dispatch operations; and
    performing, via the Dispatch Engine, re-run monitor data generation over an outage window associated with the impact scope.

12. The method of claim 11, wherein the Dispatch Engine enriches the re-run data and executes search jobs via the API.

13. The method of claim 11, wherein the re-run data relates to one or more of: a datafeed, a platform and one or more custom tasks.

14. The method of claim 11, wherein the re-run data relates to impacted infrastructure data.

15. The method of claim 11, wherein the re-run data includes impact data comprising start data and end data of the outage.

16. The method of claim 11, wherein the job generation comprises calculating earliest or latest time offsets.

17. The method of claim 11, wherein the job generation comprises one or more dispatch operations.

18. The method of claim 11, wherein the job generation comprises one or more polling operations.

19. The method of claim 11, wherein the interactive Re-Run Dashboard receives one or more inputs from a user.

20. The method of claim 11, wherein the search job is a search for an amount of internet protocol (IP) addresses that requested a web page during a predetermined period of time.

* * * * *